(12) United States Patent
Pinarbasi

(10) Patent No.: US 7,136,264 B2
(45) Date of Patent: Nov. 14, 2006

(54) USE OF GOLD LEADS IN LEAD OVERLAID TYPE OF GMR SENSOR

(75) Inventor: Mustafa Pinarbasi, Morgan Hill, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 134 days.

(21) Appl. No.: 10/412,357

(22) Filed: Apr. 10, 2003

(65) Prior Publication Data

US 2004/0201928 A1 Oct. 14, 2004

(51) Int. Cl.
 *G11B 5/39* (2006.01)
(52) U.S. Cl. ........................................ 360/322
(58) Field of Classification Search ........... 360/322, 360/324.11–324.12, 324.1–324.2; 29/603.07, 29/603.13–603.16, 603.18
See application file for complete search history.

(56) References Cited

U.S. PATENT DOCUMENTS

| | | | | |
|---|---|---|---|---|
| 5,140,484 | A | | 8/1992 | Maruyama ................... 360/113 |
| 5,442,507 | A | * | 8/1995 | Koga et al. .................. 360/322 |
| 5,491,600 | A | | 2/1996 | Chen et al. .................. 360/113 |
| 5,896,252 | A | | 4/1999 | Kanai ........................... 360/113 |
| 6,172,859 | B1 | | 1/2001 | Watanabe et al. ......... 360/327.3 |
| 6,219,207 | B1 | | 4/2001 | Pinarbasi ..................... 360/322 |
| 6,226,158 | B1 | | 5/2001 | Pinarbasi ..................... 360/322 |
| 6,447,839 | B1 | * | 9/2002 | Hegde et al. ................ 427/125 |
| 6,493,194 | B1 | * | 12/2002 | Sakaguchi et al. .......... 360/322 |
| 6,634,087 | B1 | * | 10/2003 | Horng et al. ............. 29/603.08 |
| 6,665,154 | B1 | * | 12/2003 | Ju et al. ...................... 360/322 |
| 6,729,014 | B1 | * | 5/2004 | Lin et al. .................. 29/603.14 |
| 6,813,121 | B1 | * | 11/2004 | Pinarbasi ..................... 360/322 |
| 6,844,998 | B1 | * | 1/2005 | Aoki et al. .................. 360/322 |
| 6,934,129 | B1 | * | 8/2005 | Zhang et al. ................ 360/322 |
| 6,954,341 | B1 | * | 10/2005 | Kamata et al. ............. 360/322 |
| 6,989,972 | B1 | * | 1/2006 | Stoev et al. ................. 360/322 |
| 2001/0001256 | A1 | | 5/2001 | Hsiao ....................... 360/246.6 |
| 2002/0024775 | A1 | | 2/2002 | Hasegawa ................ 360/324.1 |
| 2002/0051328 | A1 | | 5/2002 | Hasegawa ................... 360/322 |
| 2003/0053265 | A1 | * | 3/2003 | Terunuma et al. .......... 360/322 |

FOREIGN PATENT DOCUMENTS

| | | |
|---|---|---|
| JP | 03-244170 | 10/1991 |
| JP | 10-003619 | 1/1998 |
| JP | 2000099926 | * 4/2000 |

* cited by examiner

*Primary Examiner*—Angel Castro
(74) *Attorney, Agent, or Firm*—Robert O. Guillot; Intellectual Property Law Offices

(57) ABSTRACT

A magnetic head including a lead overlaid read head component in which the electrical current passing through the overlaid passive regions of the sensor layers is reduced. The parts of the electrical leads that overlay the sensor layers are comprised of gold. The exceptional electrical conductivity of gold allows most sensor electrical current to flow through the overlaid leads and significantly reduces the amount of sensor electrical current that passes through the overlaid sensor layers. The operational characteristics of the read head are improved because the overlaid passive regions of the sensor layers do not contribute to the sensor signal. Noise and side reading effects are thereby reduced. In alternative embodiments of the present invention of gold is also used to overlay portions of the electrical leads that are away from the overlaid portions. This further reduces the sensor electrical current that passes through the overlaid sensor layers.

22 Claims, 2 Drawing Sheets

USE OF GOLD LEADS IN LEAD OVERLAID TYPE OF GMR SENSOR

BACKGROUND OF THE INVENTION

1. Field of the Invention

The present invention relates generally to read head portions of magnetic heads for hard disk drives, and more particularly to a read head having a lead overlaid magnetoresistive sensor.

2. Description of the Prior Art

One well known way to increase the performance of hard disk drives is to increase the areal data storage density of the magnetic hard disk. This can be accomplished by reducing the written data track width, such that more tracks per inch can be written on the disk. To read data from a disk with a reduced track width, it is also necessary to develop sufficiently narrow read head components, such that unwanted magnetic field interference from adjacent data tracks is substantially eliminated.

The standard prior art read head elements include a plurality of thin film layers that are deposited and fabricated to produce a GMR read head, as is known to those skilled in the art. Significantly, where the width of the thin film sensor layers that comprise the GMR read head is reduced below certain values, the magnetic properties of the layers are substantially compromised. To overcome this problem, GMR read heads have been developed in which the thin film sensor layers have an ample width and the electrical leads are overlaid on top of portions of the thin film sensor layers. This lead overlaid configuration has the effect of creating an active read head region having a width that is less than the entire width of the deposited layers, such that the magnetic properties of the thin film layers can be substantially preserved. Thus, in the lead overlaid GMR read heads of the prior art, active magnetic layer portions exist between the inner ends of the electrical leads and passive magnetic layer portions exist beneath the electrical leads.

A problem that has been recognized with regard to such prior art lead overlaid read heads is that the passive region of the magnetic layers of the read head, and particularly the free magnetic layer, is not entirely passive. That is, external magnetic fields, such as from adjacent data tracks, can create magnetic field fluctuations within the passive regions of the free magnetic layer beneath the electrical leads. When some electrical current from the overlaid leads passes through the passive sensor regions, signal noise is created. The present invention seeks to solve this problem by reducing the electrical current that passes through the passive regions of the sensor magnetic layers.

As will become clear from reading the detailed description herebelow, the present invention utilizes gold in the electrical lead overlay structure due to its superior conductivity. A problem that has occurred in the prior art where gold has been employed for magnetic head components has been that the low ductility of gold results in the creation of gold nodules and smearing at the ABS surface of the head. That is, gold structures at the ABS have a history of extruding outwardly from the ABS surface to form projecting bump-like structures termed nodules. The projecting gold will also smear across the magnetic head structures at the ABS and can electrically short the magnetic head components, leading to significant noise and ultimately the total failure of the head. The present invention solves this problem through the utilization of only thin films of gold that are applied only in small, critical areas, such that the quantity of gold is minimized and the smearing and nodule formation problems are avoided.

SUMMARY OF THE INVENTION

The present invention is an improved magnetic head for a hard disk drive including a lead overlaid read head component in which the electrical current passing through the overlaid passive regions of the sensor layers is reduced. In the present invention the parts of the electrical leads that overlay the sensor layers are comprised of gold. The exceptional electrical conductivity of gold allows most sensor electrical current to flow through the overlaid leads and significantly reduces the amount of sensor electrical current that passes through the overlaid sensor layers. As a result, the operational characteristics of the read head are improved because the overlaid passive regions of the sensor layers do not contribute to the sensor signal. Noise and side reading effects are thereby reduced and the performance of the read head is thereby improved. In alternative embodiments of the present invention of gold is also used to overlay portions of the electrical leads that are away from the overlaid portions. This increases the conductivity of the electrical leads and further reduces the sensor electrical current that passes through the overlaid sensor layers.

It is an advantage of the magnetic head of the present invention that a lead overlaid read head has been developed with reduced noise and side reading problems.

It is another advantage of the magnetic head of the present invention that a lead overlaid read head has been developed having gold overlaid leads that reduce sensor electrical current that passes through passive sensor regions of the head.

It is an advantage of the hard disk drive of the present invention that it includes a magnetic head having reduced side reading and noise.

It is another advantage of the hard disk drive of the present invention that it includes a magnetic head having a lead overlaid read head having gold overlaid leads that reduce sensor electrical current that passes through passive sensor regions of the head.

These and other features and advantages of the present invention will no doubt become apparent to those skilled in the art upon reading the following detailed description with makes reference to the several figures of the drawings.

IN THE DRAWINGS

DETAILED DESCRIPTION OF THE PREFERRED EMBODIMENTS

Figure 1:
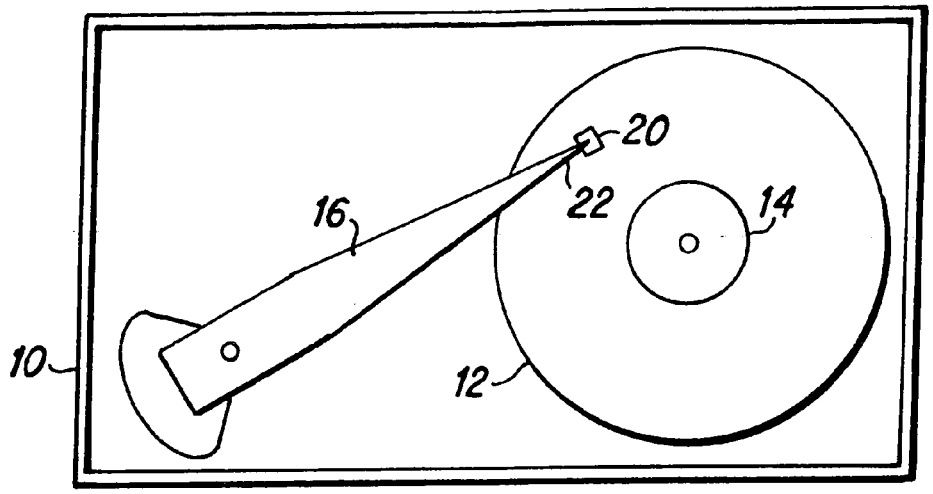
FIG. 1 is a top plan view depicting a hard disk drive having a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16, each having one or more magnetic heads 20 mounted upon the distal end 22 of the actuator arm. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

One way to increase the areal data storage density of a hard disk 12 is to narrow the track width of the data tracks written on the hard disk, such that more tracks per inch can be written on the disk. To write data in narrower tracks it is first necessary to develop the write head components of magnetic heads with a narrower written track width. Correspondingly, it is also necessary to develop read head components of such magnetic heads 20 having narrowed active read head widths, such that side reading from adjacent data tracks is minimized. However, as is known in the prior art, and described in detail herebelow, performance limitations exist with regard to the width of the thin film sensor layers that form the read head active components of GMR read heads. That is, the desirable magnetic properties of the thin film sensor layers of the read head are adversely affected where the width of the sensor layers is decreased below certain values. A prior art attempt to overcome this limitation is the electrical lead overlaid read head configuration that is depicted in FIG. 2, and next described.

Figure 2:
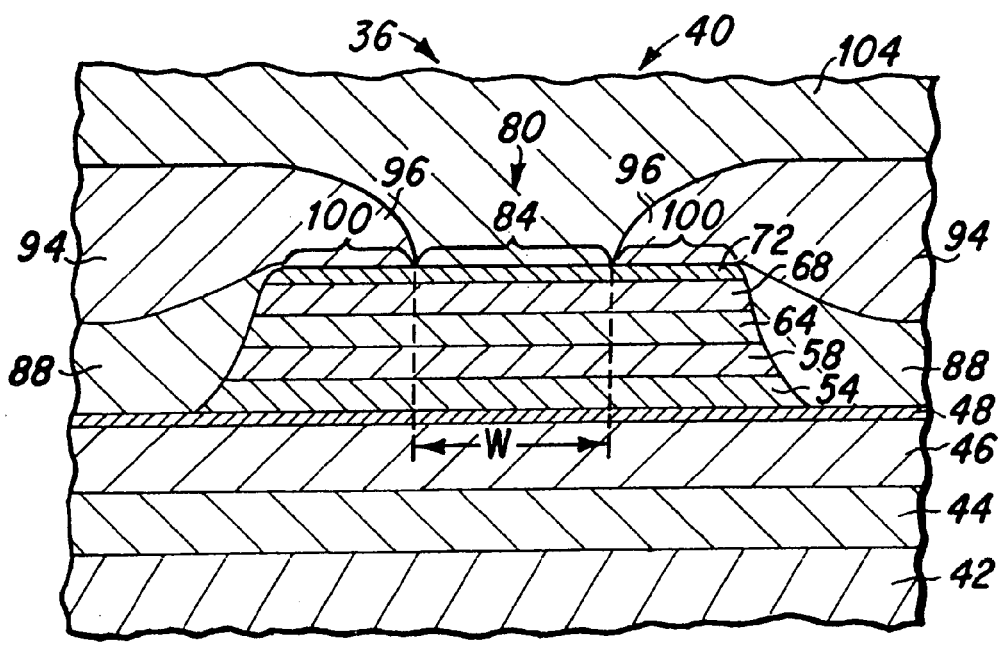
FIG. 2 is an air bearing surface (ABS) view of a prior art lead overlaid read head portion of a magnetic head.

FIG. 2 is a side cross-sectional view of a prior art electrical lead overlaid read head 36 portion of a magnetic head 40. As depicted therein, the prior art lead overlaid read head 36 generally includes a substrate base 42 that constitutes the material from which the magnetic head is fabricated, such as aluminum titanium carbide. A first magnetic shield 44 is fabricated on the substrate, and an insulation layer 46, typically composed of aluminum oxide, is fabricated upon the magnetic shield 44. A seed layer 48 is deposited upon the insulation layer 46 and a series of thin film sensor layers are sequentially deposited upon the seed layer 48 to form a GMR read head. A variety of thin film layers are known in the prior art to fabricate such GMR read heads, and, for the purposes of the present invention the layers generally include an antiferromagnetic layer 54, a pinned magnetic layer 58 that is deposited upon the antiferromagnetic layer 54, a spacer layer 64 that is deposited upon the pinned magnetic layer 58, a free magnetic layer 68 that is deposited upon the spacer layer 54 and a cap layer 72 that is deposited upon the free magnetic layer 68. Typically, the antiferromagnetic layer 54 may be composed of PtMn, the pinned magnetic layer 58 may be composed of CoFe, the spacer layer 64 may be composed of Cu, the free magnetic layer 68 may be composed of CoFe and the cap layer 72 may be composed of Ta.

Following the deposition of the GMR read head layers 54–72, a patterned etching process is conducted such that only central regions 80 of the layers 54–72 remain. Thereafter, hard bias elements 88 are deposited on each side of the central regions 80. Following the deposition of the hard bias elements 88, electrical lead elements 94 are fabricated on top of the hard bias elements 88. As depicted in FIG. 2, inner ends 96 of the leads 94 are overlaid on top of outer portions 100 of the layers 54–72 of the central read head layer regions 80. A second insulation layer 104 is fabricated on top of the electrical leads 94 and cap layer 72, followed by the fabrication of a second magnetic shield (not shown) and further components that are well known to those skilled in the art for fabricating a complete magnetic head.

A significant feature of the prior art lead overlaid GMR read head 36 depicted in FIG. 2 is that the portion of the central layer region 80 which substantially defines the track reading width W of the read head 40 is the central portion 84 of the read head layer regions 80 that is disposed between the inner ends 96 of the electrical leads 94. That is, because the electrical current flows through the read head layers between the electrical leads 94, the desired active portion 84 of the read head layers comprises the width W between the inner ends 96 of the electrical leads 94. The outer portions 100 of the read head layers disposed beneath the overlaid inner ends 96 of the electrical leads 94 are somewhat passive in that less electrical current moving between the electrical leads 94 passes through them. A problem with the prior art lead overlaid read head 36 depicted in FIG. 2 is that significant sensor electrical current does pass through the passive sensor regions 100, and side reading effects from adjacent data tracks as well as magnetic noise is created in the passive regions 100 of the free layer 68 beneath the electrical lead ends 96. It is an object of the present invention to reduce the sensor electrical current that passes through the sensor layers in the passive outer areas 100 beneath the electrical leads, to reduce the magnetic noise and the side reading effects.

Figure 4:
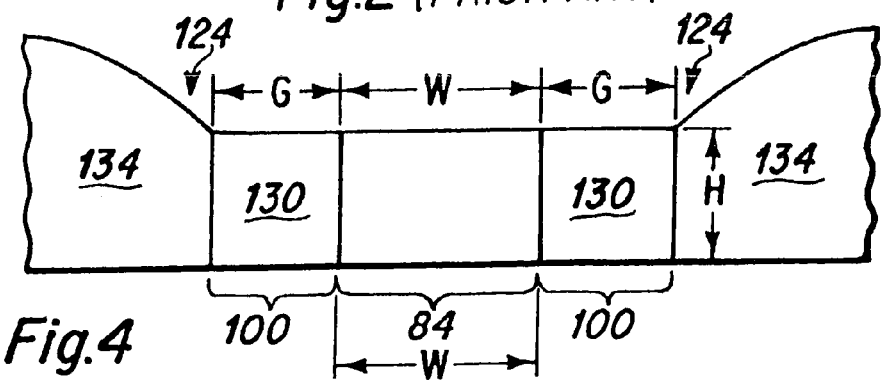
FIG. 4 is a top plan view of the lead overlaid read head portion of a magnetic head depicted in FIG. 4.
Figure 3:
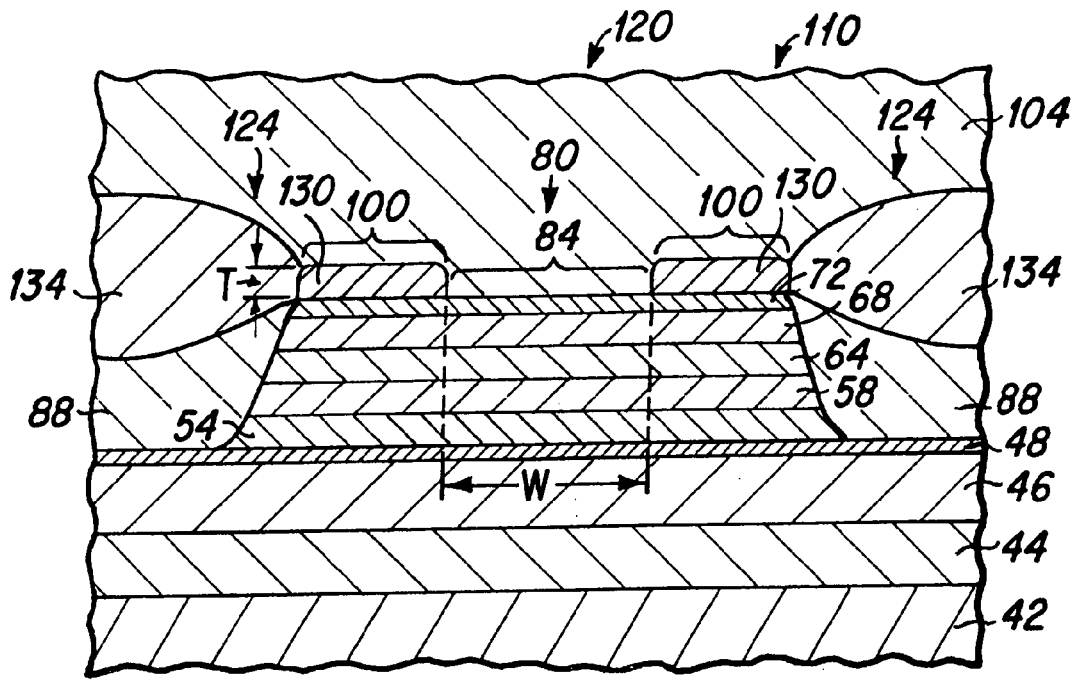
FIG. 3 is an air bearing surface (ABS) view of a first embodiment of a lead overlaid read head portion of a magnetic head of the present invention.

A first magnetic head embodiment 110 of the present invention, which is suitable for use as the magnetic head 20 of FIG. 1, having a lead overlaid read head 120 structure of the present invention is depicted in an air bearing surface (ABS) view in FIG. 3 and a top plan view in FIG. 4. As depicted therein, the read head 120 includes a GMR read head with thin film sensor layers 80, as well as the hard bias elements 88. The significant feature of the read head 120 is the utilization of an electrical lead structure 124 that includes overlaid lead portions 130 that are comprised of gold, together with larger outer lead portions 134 of the electrical lead structure 124, which are comprised of typical electrical lead materials and fabricated in electrical connection with the gold overlaid lead portions 130. As can also be seen in the top plan view of FIG. 4, the gold overlaid lead portions 130 are fabricated on top of the MR sensor stripe layers 80, to have the same small stripe height H as the sensor layers 80. Thus, in a preferred embodiment, each of the gold overlaid lead portions will have a stripe height H of approximately 0.12 microns. Where the overall width of the sensor layers 80 is approximately 0.3 microns, the central track width W of the active sensor portion 84 between the ends of the gold overlaid lead portions 130 will be approximately 0.1 microns, and each of the gold overlaid lead portions 130 will have a width G of approximately 0.1 microns. In the preferred embodiment, the thickness T of the gold overlaid lead portions 130 may be from approximately 50 Å to 500 Å, with a preferred range of from 100 to 300 Å and a preferred thickness of approximately 250 Å.

An advantage of using gold in the overlaid lead portions 130 is that gold possesses an electrical resistivity that is significantly lower than other typically used materials, such as rhodium. Specifically, gold has a resistivity of approximately 3.5 in a thin film form where rhodium has a resistivity of approximately 10 in a thin film form. Thus, the resistivity of gold is approximately one third of the resistivity of rhodium. As a result, if gold were applied at the same thickness as a rhodium overlaid lead, its resistance would be approximately one third of the resistivity of the rhodium lead, and the gold overlaid lead portions 130 will conduct approximately three times the current as the rhodium leads if the gold were deposited in the same thickness as rhodium. Therefore the gold overlaid leads 130 can be deposited in a thickness that is less than the rhodium lead thickness and still provide better performance, in that a greater percentage of the electrical current that passes through the read head will be shunted through the gold overlaid leads and not pass through the passive, overlaid outer ends 100 of the sensor stripe. As a result, magnetic interference is significantly reduced because the portion of the sensor electrical current that passes through the passive sensor layer regions 100 is significantly reduced, as the electrical current is shunted through the low resistivity gold overlaid lead portions 130. Because a greater portion of the electrical sensor current passes through the gold lead overlays and into and through only the central portion 84 of the sensor, the read width of the sensor is more accurately defined, and side reading and signal noise is reduced through the use of the gold overlaid lead design of the present invention.

A significant feature of the embodiment of the present invention that is depicted in FIGS. 3 and 4, is that the quantity of gold that is utilized in the read head is minimized. That is, as viewed from the ABS (FIG. 3), the quantity of gold that is present at the ABS is approximately 0.1 microns wide and approximately 250 Å thick. Thus the gold overlaid portions 130 will each have an ABS surface exposed area of $0.1\mu \times 250$ Å=$2.5\times10^{-3}\mu^2$. Where the stripe height H of the gold overlay portion 130 is approximately 0.12 microns, the volume of gold in each of the gold overlaid portions is $2.5\times10^{-3}\mu^2 \times 0.12\mu = 3\times10^{-4}\mu^3$. As a result, the quantity of gold used in the present invention is minimal, and this has a direct effect on eliminating the gold smearing and nodule formation that has effectively limited the use of gold in prior art fabricated head designs. Basically, the thickness and quantity of gold that is utilized in the lead overlaid portions 130 of the present invention is minimized, so that the ductile properties associated with larger quantities of gold are not evidenced. The thin gold layers thus do not result in the smearing and nodule formation problems that are seen in the prior art, and which have limited the use of gold.

The first embodiment 120 of the present invention is fabricated by the addition of some fabricating steps into the well known fabrication process for the prior art heads. Basically, the standard head fabrication process includes the deposition of the first magnetic shield 44, insulation layer 46 and sensor layers 48–72 across the entire surface of the wafer. Thereafter, using photolithographic techniques, small resist masks are fabricated to cover the central, active areas 84 of the sensor. Thereafter, a layer of gold is deposited across the surface of the wafer which covers everywhere except the masked central regions 84 of the heads. Thereafter, the entirety of the sensor stripe, including the gold overlaid outer portions 130 is masked, and a material removal step is conducted, such as by ion beam milling, to remove the unmasked outer portions of the sensor layers down to the seed layer 48. Thereafter, the hard bias elements 88 and the remaining electrical lead material 134 are sequentially deposited, such that electrical interconnection is established between the outer lead portions 134 and the gold lead overlaid portions 130. In this manner, the electrical lead structure 124 of the present invention is created. Thereafter, the mask covering the sensor layers 80 and gold overlaid leads 130 is removed, and the second insulation layer 104 is subsequently deposited across the surface of the wafer, followed by further steps to complete the fabrication of the magnetic head that are well known to those skilled in the art.

Figure 5:
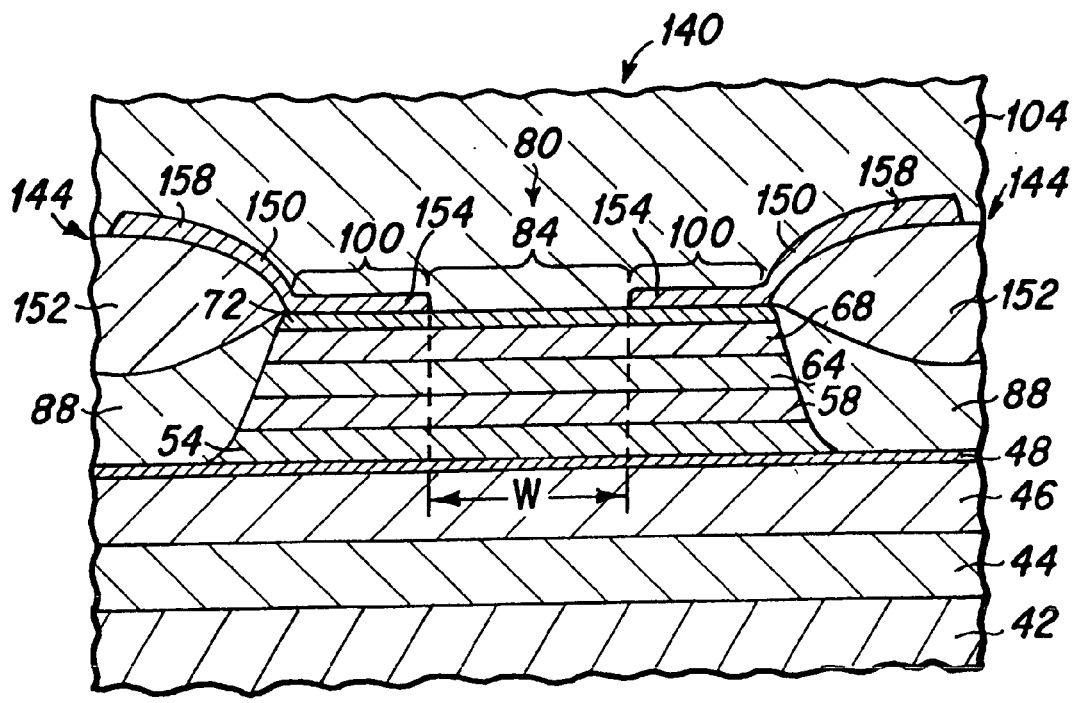
FIG. 5 is an air bearing surface view of a second embodiment of a lead overlaid read head portion of a magnetic head of the present invention.

An alternative embodiment 140 of a magnetic head of the present invention is depicted in the side cross-sectional view of FIG. 5, wherein identical structures to those described hereabove have been identically numbered. The magnetic head 140 depicted in FIG. 5 includes an electrical lead structure 144 that includes overlaid leads 150 that are comprised of gold, and outer lead portions 152 that are comprised of typical electrical lead materials. The gold overlaid leads 150 include inner portions 154 that are fabricated on top of the passive regions 100 of the sensor layers 80, and outer portions 158 that are fabricated on top of a portion of the outer electrical leads 152. In this embodiment, advantage is taken of the higher conductivity properties of gold in extending the outer portion 158 of the overlaid gold leads on top of a portion of the outer leads 152, such that a greater quantity of the sensor electrical current will be directed into the high conductivity thin outer gold layer 158 and then into the inner portions 154 of the gold overlaid leads. As a result, the electrical current that passes through the passive outer regions 100 of the sensor layers 80 is reduced, such that the side reading and signal noise are reduced. Thus, as with the first embodiment depicted in FIGS. 3 and 4, an advantage of the embodiment depicted in FIG. 5 is that a greater percentage of the sensor electrical current passes through the overlaid leads 150 and through the central active portion 84 of the sensor layers, and a reduced percentage of the sensor electrical current passes through the passive outer portions 100 of the sensor layers.

The alternative embodiment 140 depicted in FIG. 5 may appear to have a greater tendency towards the gold nodule formation and smearing problems as apparently a greater quantity of gold is utilized in it. However, the thickness of the gold overlay in the alternative embodiment depicted in FIG. 5 can be somewhat reduced from that depicted in FIGS. 3 and 4 in that the outer gold overlaid portions 158 have a significantly greater contact area with the outer leads 152 than does the embodiment depicted in FIGS. 3 and 4. As a result, there is an increased tendency for sensor electrical current to flow through the gold overlaid portion 150. Therefore, it is not necessarily the case that there will be an increased quantity of gold at the ABS in the embodiment depicted in FIG. 5.

The device depicted in FIG. 5 can be fabricated in the identical manner as the device depicted in FIGS. 3 and 4, with the additional step that following the fabrication of the outer electrical leads 134 of FIG. 3, of the deposition of a thin gold layer, similar to portion 158 that would make electrical connection with the previously fabricated central portion 130 (of FIG. 3). Alternatively, the embodiment of FIG. 5 can be initially fabricated as a typical prior art head, including the deposition of the electrical leads 152 having a configuration as depicted in FIG. 5. Thereafter, the central portion 84 of the sensor layer is masked, such as by using photolithographic techniques, and a single gold layer deposition results in the fabrication of the gold overlaid lead structure 150 of FIG. 5, including the central overlaid portions 154 and the outer gold portions 158 that are deposited on portions of the outer electrical leads 152.

As will now be understood, the present invention utilizes gold for the portions of the leads that overlay the passive regions of the sensor. While gold is well known to produce problems of smearing and nodule formation at the air bearing surface of magnetic heads due to its low ductility, the present invention succeeds in using gold by using thin layers and small quantities of gold, such that the smearing and nodule formation problems associated with the use of gold in prior art heads are avoided.

The present invention is intended to apply to various types and configurations of GMR read heads that include various numbers and types of thin film layers to provide improved read head characteristics for lead overlaid configurations. Therefore, while the present invention has been shown and described with regard to certain preferred embodiments, it will be understood that those skilled in the art will no doubt develop certain alterations and modifications thereto which nevertheless include the true spirit and scope of the invention. It is therefore intended that the following claims cover all such alterations and modifications.

I claim:

1. A magnetic head, comprising:
    a plurality of sensor layers having an inner portion and outer portions;
    an electrical lead structure being disposed in electrical contact with said sensor layers, such that sensor electrical current flows through said electrical lead structure and through said sensor layers;
    said electrical lead structure including a gold inner lead portion that is overlaid directly upon said outer portions of said sensor layers and only upon said outer portions of said sensor layers, and an outer lead portion that is disposed directly upon and in electrical contact with said inner lead portion, and wherein said outer lead portion is not disposed above said outer portions of said sensor layers.

2. A magnetic head as described in claim 1 wherein said gold inner lead portion has a height that is approximately equal to a stripe height of said sensor layer.

3. A magnetic head as described in claim 1 wherein said gold inner lead portion has a thickness of from approximately 50 Å to approximately 500 Å.

4. A magnetic head as described in claim 1 wherein said gold inner lead portion has a thickness of from approximately 100 Å to approximately 300 Å.

5. A magnetic head as described in claim 1 wherein said gold inner lead portion has a thickness of approximately 250 Å.

6. A magnetic head as described in claim 1 wherein said gold inner lead portion has a cross-sectional area exposed at an air bearing surface of said head of approximately $2.5 \times 10^{-3}$ $\mu^2$.

7. A magnetic head as described in claim 1 wherein said gold inner lead portion has a volume of approximately $3 \times 10^{-4}$ $\mu^3$.

8. A magnetic head, comprising:
    a plurality of sensor layers;
    an electrical lead structure being disposed in electrical contact with said sensor layers, such that sensor electrical current flows through said electrical lead structure and through said sensor layers;
    said electrical lead structure including a gold inner lead portion that is overlaid directly upon outer portions of said sensor layers and only upon said outer portions of said sensor layers, and an outer lead portion that is disposed in electrical contact with said inner lead portion; and
    wherein a gold outer lead portion is disposed upon said outer lead portion of said electrical lead structure, said gold outer lead portion being electrically connected with said gold inner lead portion and with said outer lead portion of said electrical lead structure.

9. A magnetic head as described in claim 8 wherein said gold inner lead portion and said gold outer lead portion are integrally formed.

10. A magnetic head as described in claim 8 wherein said gold inner lead portion and said gold outer lead portion have approximately the same thickness.

11. A hard disk drive including a magnetic head, comprising:
    a plurality of sensor layers having an inner portion and outer portions;
    an electrical lead structure being disposed in electrical contact with said sensor layers, such that sensor electrical current flows through said electrical lead structure and through said sensor layers;
    said electrical lead structure including a gold inner lead portion that is overlaid directly upon said outer portions of said sensor layers and only upon said outer portions of said sensor layers, and an outer lead portion that is disposed directly upon and in electrical contact with said inner lead portion, and wherein said outer lead portion is not disposed above said outer portions of said sensor layers.

12. A hard disk drive as described in claim 11 wherein said gold inner lead portion has a height that is approximately equal to a stripe height of said sensor layer.

13. A hard disk drive as described in claim 11 wherein said gold inner lead portion has a thickness of from approximately 50 Å to approximately 500 Å.

14. A hard disk drive as described in claim 11 wherein said gold inner lead portion has a thickness of from approximately 100 Å to approximately 300 Å.

15. A hard disk drive as described in claim 11 wherein said gold inner lead portion has a thickness of approximately 250 Å.

16. A hard disk drive as described in claim 11 wherein said gold inner lead portion has a cross-sectional area exposed at an air bearing surface of said head of approximately $2.5 \times 10^{-3}$ $\mu^2$.

17. A hard disk drive as described in claim 11 wherein said gold inner lead portion has a volume of approximately $3 \times 10^{-4}$ $\mu^3$.

18. A hard disk drive including a magnetic head, comprising:
    a plurality of sensor layers;
    an electrical lead structure being disposed in electrical contact with said sensor layers, such that sensor electrical current flows through said electrical lead structure and through said sensor layers;
    said electrical lead structure including a gold inner lead portion that is overlaid directly upon outer portions of said sensor layers and only upon said outer portions of said sensor layers, and an outer lead portion that is disposed directly upon and in electrical contact with said inner lead portion; and
    wherein a gold outer lead portion is disposed upon said outer lead portion of said electrical lead structure, said gold outer lead portion being electrically connected with said gold inner lead portion and with said outer lead portion of said electrical leads.

19. A hard disk drive as described in claim 18 wherein said gold inner lead portion and said gold outer lead portion are integrally formed.

20. A hard disk drive as described in claim 18 wherein said gold inner lead portion and said gold outer lead portion have approximately the same thickness.

21. A method for fabricating a magnetic head, comprising:
depositing a plurality of sensor layers upon a substrate;
masking a central area of said sensor layers with a first mask;
depositing a first gold layer upon unmasked outer portions of said sensor layers;
masking a sensor area including portions of said first gold layer that are deposited upon said sensor layers with a second mask;
removing unmasked material;
depositing a hard bias layer following said removing unmasked material;
depositing electrical leads upon said hard bias layer in electrical connection with remaining portions of said first gold layer; and
removing said second mask.

22. A method for fabricating a magnetic head as described in claim 21 including the step of depositing a second gold layer upon portions of said electrical leads and in direct contact with said remaining portions of said first gold layer.

* * * * *